US011012015B1

(12) United States Patent
Joyce et al.

(10) Patent No.: US 11,012,015 B1
(45) Date of Patent: May 18, 2021

(54) MOTOR WITH INTEGRATED POWER AND SIGNAL CONNECTOR

(71) Applicant: Applied Motion Products, Inc., Watsonville, CA (US)

(72) Inventors: Dennis P. Joyce, Brimfield, MA (US); Jeffrey Andrew Kordik, Watsonville, CA (US); Kevin Albert Kesler, Santa Cruz, CA (US)

(73) Assignee: Applied Motion Products, Inc., Watsonville, CA (US)

( * ) Notice: Subject to any disclaimer, the term of this patent is extended or adjusted under 35 U.S.C. 154(b) by 292 days.

(21) Appl. No.: 16/172,704

(22) Filed: Oct. 26, 2018

(51) Int. Cl.
*H02P 8/16* (2006.01)
*H01R 24/64* (2011.01)
*H02P 8/22* (2006.01)

(52) U.S. Cl.
CPC ............... *H02P 8/16* (2013.01); *H01R 24/64* (2013.01); *H02P 8/22* (2013.01); *H01R 2201/04* (2013.01)

(58) Field of Classification Search
CPC .. H02P 8/16; H02P 8/22; H01R 24/64; H01R 2201/04

USPC ..................................................... 310/12.17
See application file for complete search history.

(56) References Cited

U.S. PATENT DOCUMENTS

| 2008/0197729 | A1* | 8/2008 | Igarashi | H02K 11/22 310/71 |
| 2009/0152962 | A1* | 6/2009 | Gasser | H02K 15/12 310/43 |
| 2014/0191624 | A1* | 7/2014 | Jahshan | H02P 6/14 310/68 B |

* cited by examiner

*Primary Examiner* — Jianchun Qin
(74) *Attorney, Agent, or Firm* — Minisandram Law Firm; Raghunath S. Minisandram

(57) ABSTRACT

A motor is disclosed. The motor includes a first end bell, a second end bell and a stator with a stator coil disposed between the first end bell and the second end bell. A rotor with a rotor shaft is disposed relative to the stator, the rotor configured to rotate relative to the stator and the rotor shaft extending through the first end bell. The second end bell includes a chamber, the chamber includes an electronic circuit and a connector. The connector is electrically coupled to the electronic circuit and configured to receive both a control signal and a power signal from an external source.

26 Claims, 7 Drawing Sheets

MOTOR WITH INTEGRATED POWER AND SIGNAL CONNECTOR

CROSS-REFERENCE TO RELATED APPLICATIONS

None.

TECHNICAL FIELD

The present invention relates generally to a motor and, more particularly, to a motor with integrated power and signal connector.

DESCRIPTION OF RELATED ART

A motor, for example, a stepper motor is an electromechanical device that selectively rotates a shaft in steps, based on an input signal. Stepper motors are used in various industrial applications. For example, in some examples, the shaft of the stepper motor may be used as a prime mover to selectively move another device. By selectively moving the shaft of the stepper motor, a position of a movable portion of the another device may be advantageously changed, based on the needs of the application. The movable portion of the another device may be a carriage, a valve, a door, a rod and the like.

In some applications, the stepper motor may be used in industrial applications where the stepper motor may be coupled to a network. For example, the network may conform to one or more physical network specification like the ethernet. In some implementations, the physical network specification may provide for data signals to be transmitted over one or more conductors of the physical network cable. In some implementations, the physical network specification may provide for power signals to be transmitted over one or more conductors of the physical network cable. In some implementations, both power and data signals may be transmitted over a plurality of conductors. In some examples, conductors for both the power and data signals may be part of a single connector.

It may be desirable to design a stepper motor that may advantageously use both the data signals and power signals transmitted over the physical network cable. It is with these needs in mind, this disclosure arises.

SUMMARY OF THE INVENTION

In one embodiment, a motor is disclosed. The motor includes a first end bell, a second end bell and a stator with a stator coil disposed between the first end bell and the second end bell. A rotor with a rotor shaft is disposed relative to the stator, the rotor configured to rotate relative to the stator and the rotor shaft extending through the first end bell. The second end bell including a chamber, the chamber including an electronic circuit and a connector, wherein the connector is electrically coupled to the electronic circuit and configured to receive both a control signal and a power signal from an external source.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

Figure 1A:
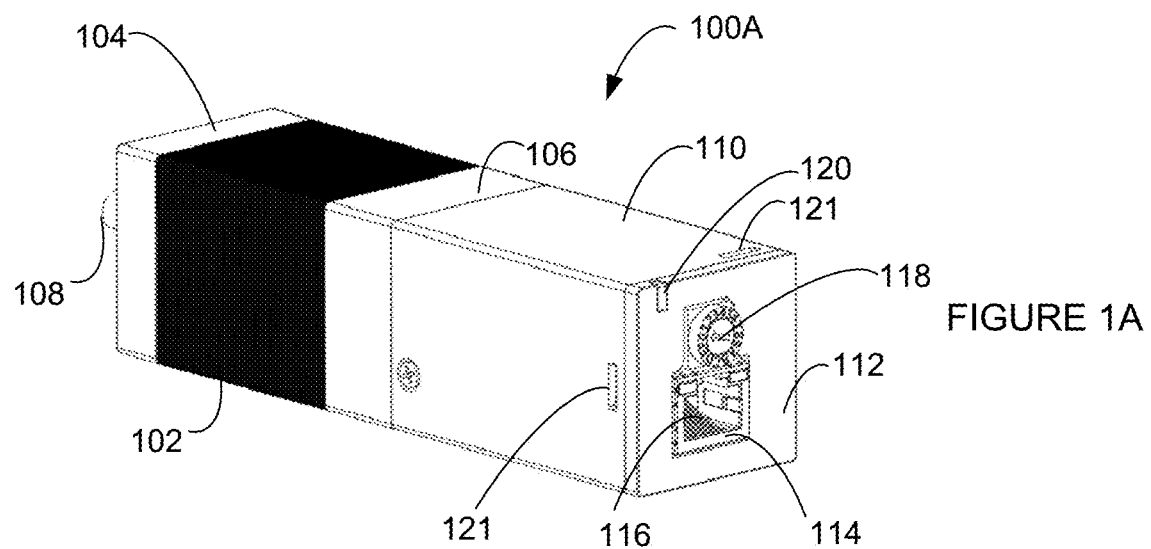
FIG. 1A shows an example motor, according an aspect of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a motor with an integrated power and data connector. Referring now to the drawings, where similar reference characters denote corresponding features consistently throughout the figures, various examples of this disclosure is described.

FIG. 1A depicts an example motor 100A with an integrated power and data connector. Motor 100 includes a stator 102, a rotor, a first end bell 104 and a second end bell 106. The stator 102 includes stator laminations and stator coils wound on the stator laminations. A rotor (not shown) includes a rotor shaft 108 extending through a shaft through hole in the first end bell 104. A first bearing is disposed in the first end bell 104 and a second bearing is disposed in the second end bell 106. The rotor shaft 118 is coupled to inner race of the first bearing and the second bearing to permit rotation of the rotor relative to the stator 102 when the stator coils are selectively energized, as well known to one skilled in the art.

A chamber 110 is coupled to the second end bell 106. In this example, the chamber 110 extends along an axis parallel to the rotor shaft 108. An end wall 112 of the chamber 110 includes a cutout 114. In some examples, the end wall 112 may be an integral part of the chamber 110. In some examples, the end wall 112 may be configured to be selectively removable and attachable to the chamber 110. In one example, the end wall 112 may include a plurality of clips (not shown) configured to mate with a plurality of slits 121 in the chamber 110. In some examples, a plurality of fasteners may be used to attach the end wall 112 to the chamber 110. In some examples, a seal may be disposed along a periphery of the end wall 112 so as to seal the chamber 110. In some examples, additional seals may be disposed between the chamber and the second end bell 106. As one skilled in the art appreciates, one or more of these seals may permit the chamber 110 to be hermetically sealed.

The integrated power and data connector 116 (sometimes referred to as a PD connector 116) is positioned close to the cutout 114 so that the PD connector 116 may receive and mate with an external cable with both signal and power conductors. In this example, the end wall 112 has additional holes to permit access to a selector switch 118 and an indicator light assembly 120. The indicator light assembly 120 in some examples may be a light emitting diode. The indicator light assembly 120 in some examples may include a combination of a light pipe and a light emitting diode, wherein the light pipe is operatively positioned relative to the light emitting diode so as to pass the light emitted by the light emitting diode to an external location of the end wall 112. Selector switch 118 and light emitting diode of the indicator light assembly 120 may be part of an electronic circuit housed inside the chamber 110, which will be later described in detail.

Figure 1B:
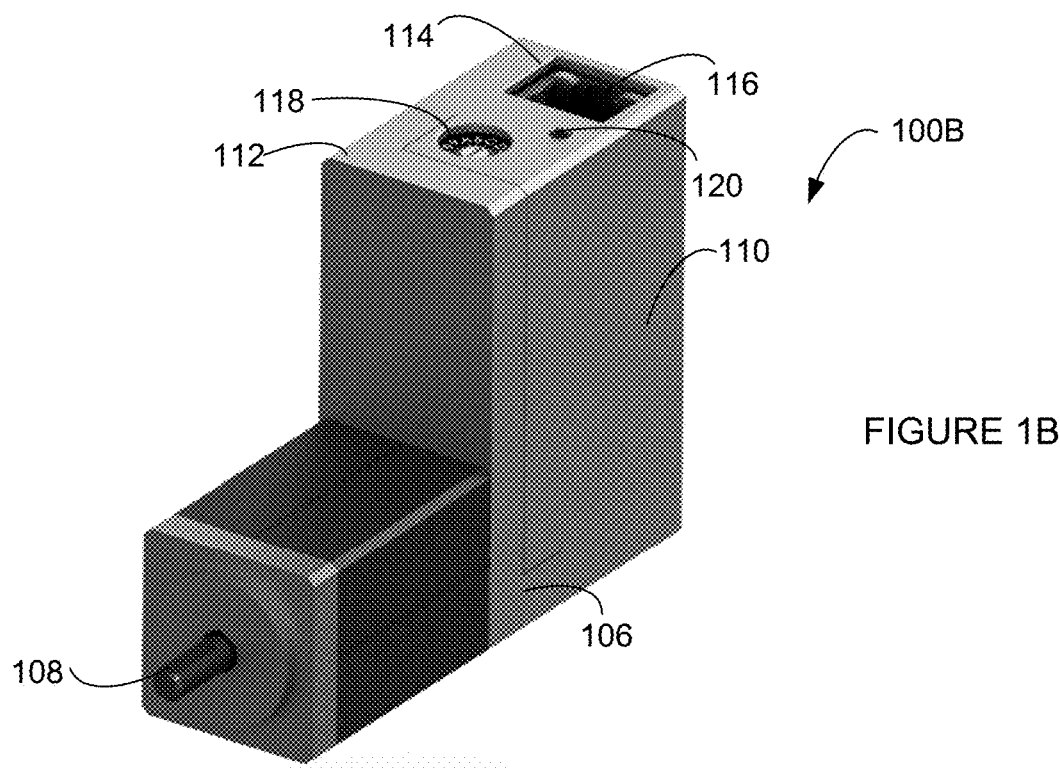
FIG. 1B shows another example motor of the motor, according to an aspect of this disclosure.

Now, referring to FIG. 1B, another example motor 100B is shown. Motor 100B is similar to motor 100A, except that the chamber 110 extends along an axis perpendicular to the rotor shaft 108. FIG. 1B also shows the end wall 112 with the cutout 114. The PD connector 116 is positioned close to the cutout 114 so that the PD connector 116 may receive and mate with an external cable with both signal and power conductors. In this example, the end wall 112 has additional holes to permit access to a selector switch 118 and an indicator light assembly 120. The indicator light assembly 120 in some examples may be a light emitting diode. The indicator light assembly 120 in some examples may include a combination of a light pipe and a light emitting diode, wherein the light pipe is operatively positioned relative to the light emitting diode so as to pass the light emitted by the light emitting diode to an external location of the end wall 112. Selector switch 118 and light emitting diode of the indicator light assembly 120 may be part of an electronic circuit housed inside the chamber 110, which will be later described in detail.

Figure 2A:
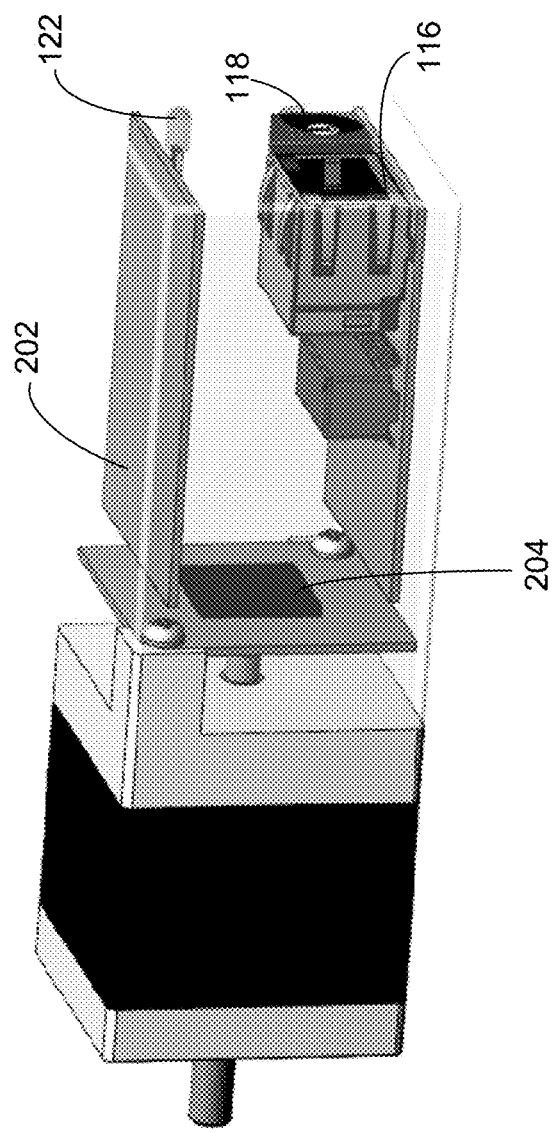
FIG. 2A shows a partial view of the motor of FIG. 1A, showing an example connector, according to an aspect of this disclosure.

Now, referring to FIG. 2A, a partial view of the motor of FIG. 1A, is shown, with the chamber walls of the chamber 110 removed. FIG. 2A shows the electronic circuit 202, an encoder 204, connector 116, selector switch 118 and light emitting diode 122. The electronic circuit 202 in in some examples, may include a plurality of circuit boards that are interconnected. Functions and features of the electronic circuit 202 will be later described in detail. The encoder 204 is configured to precisely measure the rotation of the rotor so as to generate signals to control the rotation of the rotor relative to the stator. Various examples of the encoder 204 will be later described in detail. In this example, the connector 116 may be of the type RJ45 conforming to IEEE 803.2 specification published by Institute of Electrical and Electronics Engineers (IEEE). The connector 116 of the type RJ45 includes one or more indicator lights integral with the connector.

Figure 2B:
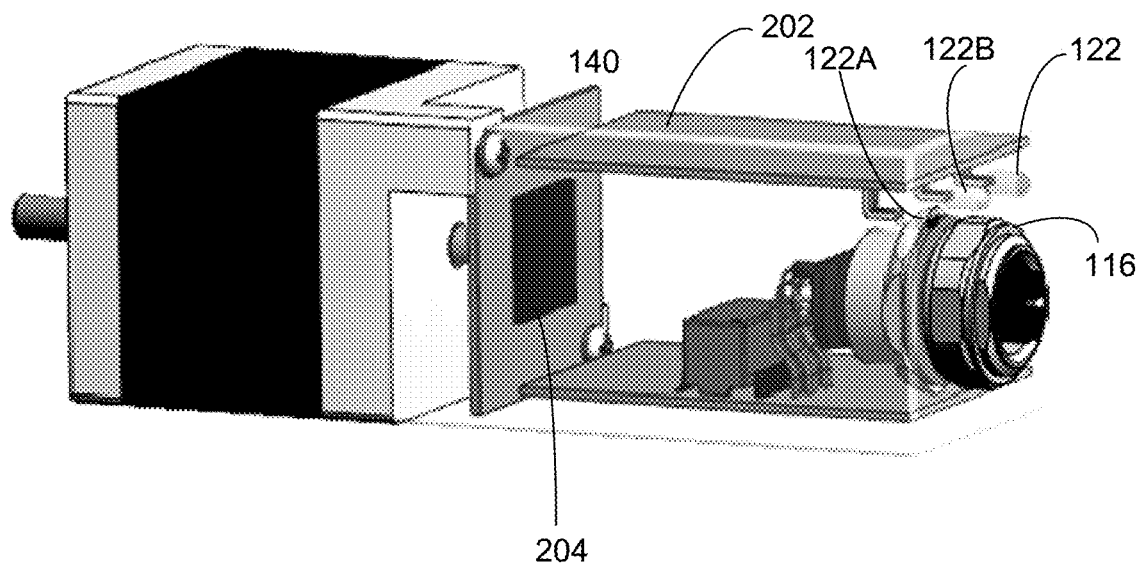
FIG. 2B shows a partial view of the motor of FIG. 1A, showing another example connector, according to an aspect of this disclosure.

Now, referring to FIG. 2B, a partial view of the motor of FIG. 1A, is shown, with the chamber walls of the chamber 110 removed. FIG. 2B shows the electronic circuit 202, an encoder 204, connector 116 and light emitting diode 122. The electronic circuit 202 in some examples, may include a plurality of circuit boards that are interconnected. Functions and features of the electronic circuit 202 will be later described in detail. The encoder 204 is configured to precisely measure the rotation of the rotor so as to generate signals to control the rotation of the rotor relative to the stator. Various examples of the encoder 204 will be later described in detail. In this example, the connector 116 may be of a 4 position D-coded or 8-position A-coded M12 connector conforming to IEEE 802.3 specification published by Institute of Electrical and Electronics Engineers (IEEE). The connector 116 of the type M12 does not include one or more indicator lights that were integral with the connector of the type RJ45 previously described with reference to FIG. 2A. In this example, additional light emitting diodes 122A and 122B are provided, that correspond to the indicator lights provided with the connector of the type M12.

Figure 2C:
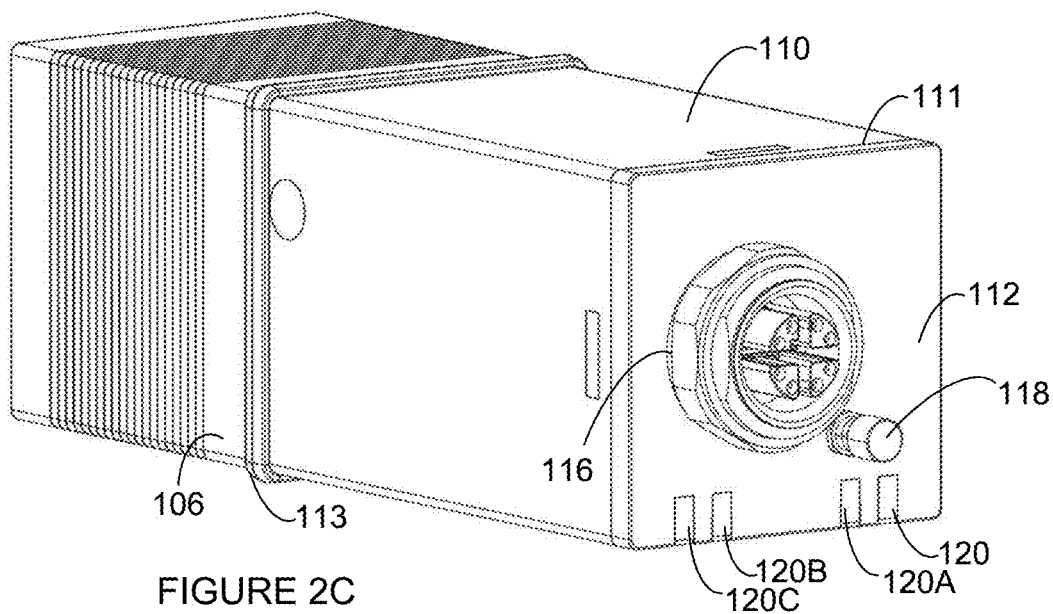
FIGS. 2C and 2D show enclosed views of the motor of FIG. 2B, according to an aspect of this disclosure.

FIG. 2C shows an example enclosed view of the motor of FIG. 1A, with connector 116 of the type M12 disposed on the end wall 112 of the chamber 110. In this example, the selector switch 118 is of a push button type. Further, the end wall 112 has a plurality of indicator light assembly 120, 120A-C. As previously described, each of the indicator light assembly 120, 120A, 120B and 120 C may include a light pipe operatively disposed relative to a light emitting diode. For example, the light pipe disposed on the end wall 112 of the chamber 110 and corresponding light emitting diode disposed on the electronic circuit 202. A first seal 111 may be disposed between the chamber 110 and the end wall 112 to selectively seal the chamber 110 from external environment. A second seal 113 may be disposed between the chamber 110 and the second end bell 106. As one skilled in the art appreciates, additional seals may be disposed between the connector 116 and the end wall 112. Similarly, additional seal may be disposed between the selector switch 118 and the end wall 112.

Figure 2D:
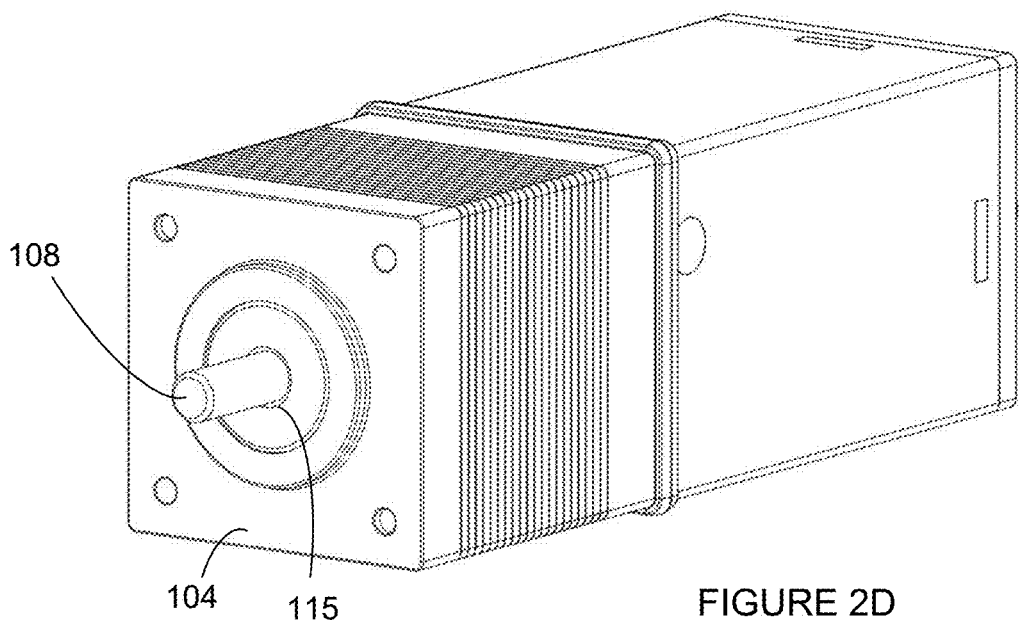

FIG. 2D shows another example enclosed view of the motor of FIG. 2C, with a third seal 115 disposed between the shaft 108 and first end bell 104 so as to seal any gap between the shaft 108 and the first end bell 104.

Figure 2E:
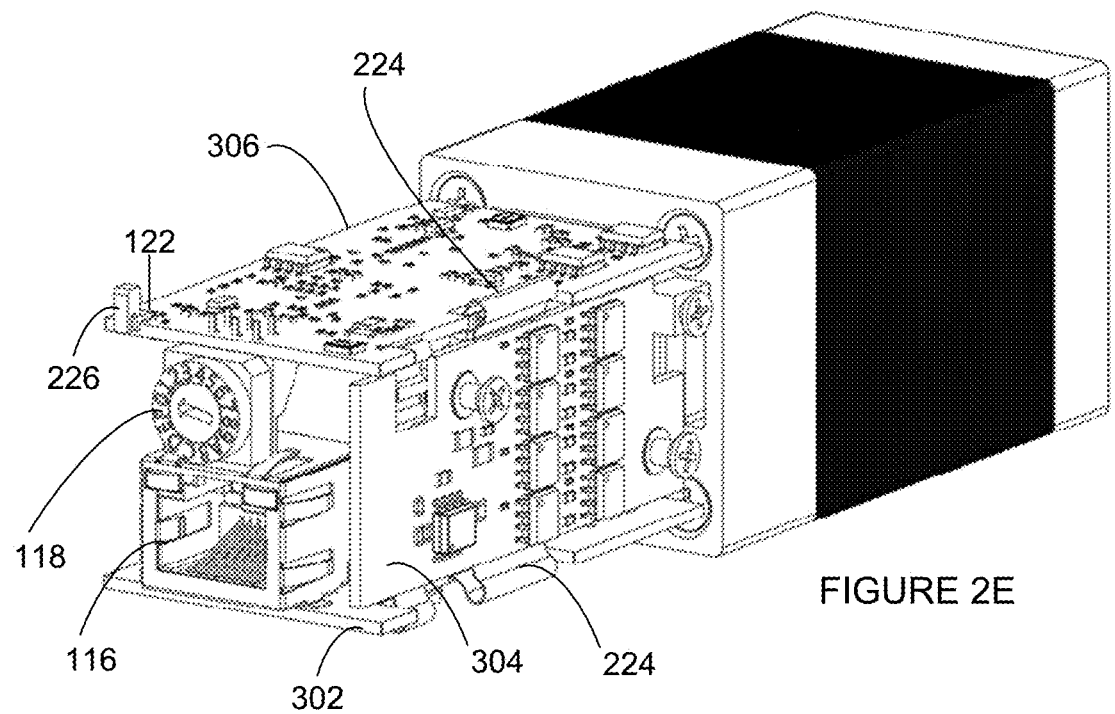
FIGS. 2E and 2F show example configuration of the electronic circuit of the motor of FIG. 1A, according to an aspect of this disclosure

Now, referring to FIG. 2E, another example configuration of the electronic circuit 202 is described. In this example, the electronic circuit 202 includes a plurality of circuit boards, for example, an interface circuit 302, a power circuit 304 and a control circuit 306. The interface circuit 302, power circuit 304 and control circuit 306 are electrically coupled to each other by a plurality of flex circuits 224. The PD connector 116 is disposed on the interface circuit 302. The light emitting diode 122 is disposed on the control circuit 306. A light pipe 226 is operatively disposed relative to the light emitting diode 122. The light pipe 226 is configured to transport the light emitted by the light emitting diode 122 external to the chamber 110. In one example, the light pipe 226 may be disposed on the end wall 112 of the chamber 110 and the light pipe 226 with the light emitting diode 122 form the indicator light assembly 120.

As one skilled in the art appreciates, the electronic circuit 202 needs to be housed inside the chamber 110. Further, components of the electronic circuit 202, especially, components that are part of the power circuit 304 may generate heat during the operation of the motor. Further, the electronic circuit 202 needs to be properly secured so as to withstand various environmental conditions, including shock and vibration. Now, referring to FIG. 2D, additional features of the example motor of FIG. 1A will now be described.

Figure 2F:
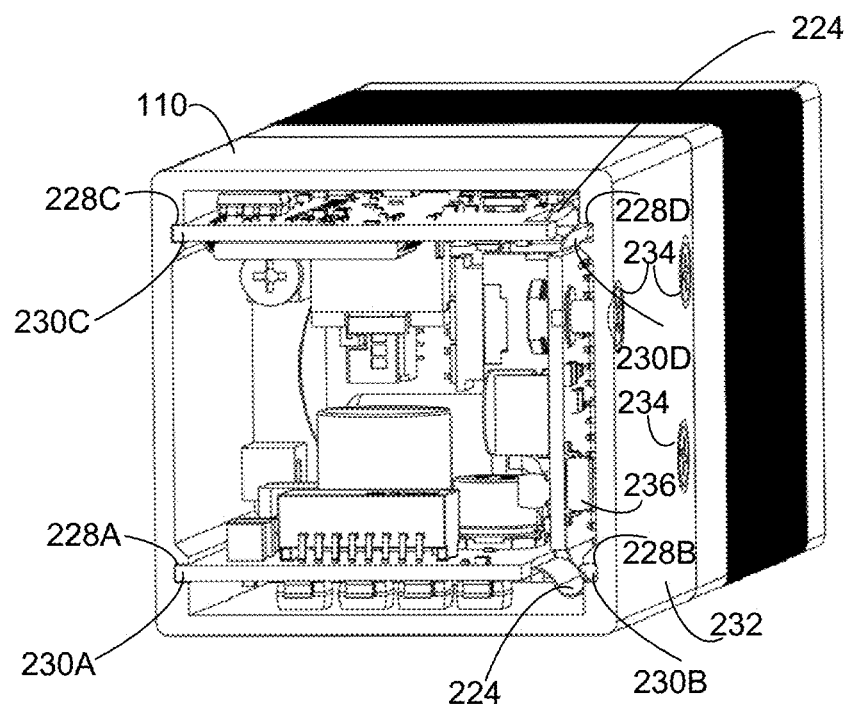

Referring to FIG. 2F, the electronic circuit 202 with the interface circuit 302, power circuit 304 and control circuit 306 described with reference to FIG. 2E housed inside the chamber 110 is described. In this example, inside walls of the chamber 110 has a plurality of slots 228A-D extending along a length of the chamber 110. The flex circuits 224 are so configured to permit the interface circuit 302 and the control circuit 306 to be positioned substantially perpendicular to the power circuit 304. In other words, if the electronic circuit 202 is laid flat, the power circuit 304 is in the middle, coupled to the interface circuit 302 on one side and the control circuit 306 on an opposite side, with the plurality of flex circuits electrically coupling the interface circuit 302, power circuit 304 and the control circuit 306. Edges 230A and 230B of the power circuit 304 are configured to be received in slots 228A and 228B. Edges 230C and 230D of the control circuit 306 are configured to be received in slots 228C and 228D.

The power circuit 304 is fastened to a side wall 232 of the chamber 110, by using a plurality of fasteners 234. In one example, the fasteners 232 are broach nuts that couple to corresponding nuts disposed in the power circuit 304. The fasteners 232 pull the power circuit 304 towards the side wall 232. In one example, one or more electronic chips disposed on the power circuit 304, for example, electronic chip 236 make physical contact with the inside wall of the side wall 232, thereby permitting transfer of any heat generated by the electronic chip 236 to the side wall 232. In other words, portion of the chamber 110 acts as a heat sink for one or more electronic chips disposed on the power circuit 304.

As one skilled in the art appreciates, the flex circuits 224 are so designed to permit selective positioning of the interface circuit 302, power circuit 304 and control circuit 306 relative to each other and permit the positioning of the interface circuit 302, power circuit 304 and control circuit 306 within the chamber 110. The flex circuit 224 further permit selective movement of the power circuit 304 to be selectively attached to the side wall 232 of the chamber 110 so as to permit dissemination of the heat generated by components of the power circuit 304 by the chamber 110 acting as a heat sink.

Figure 3:
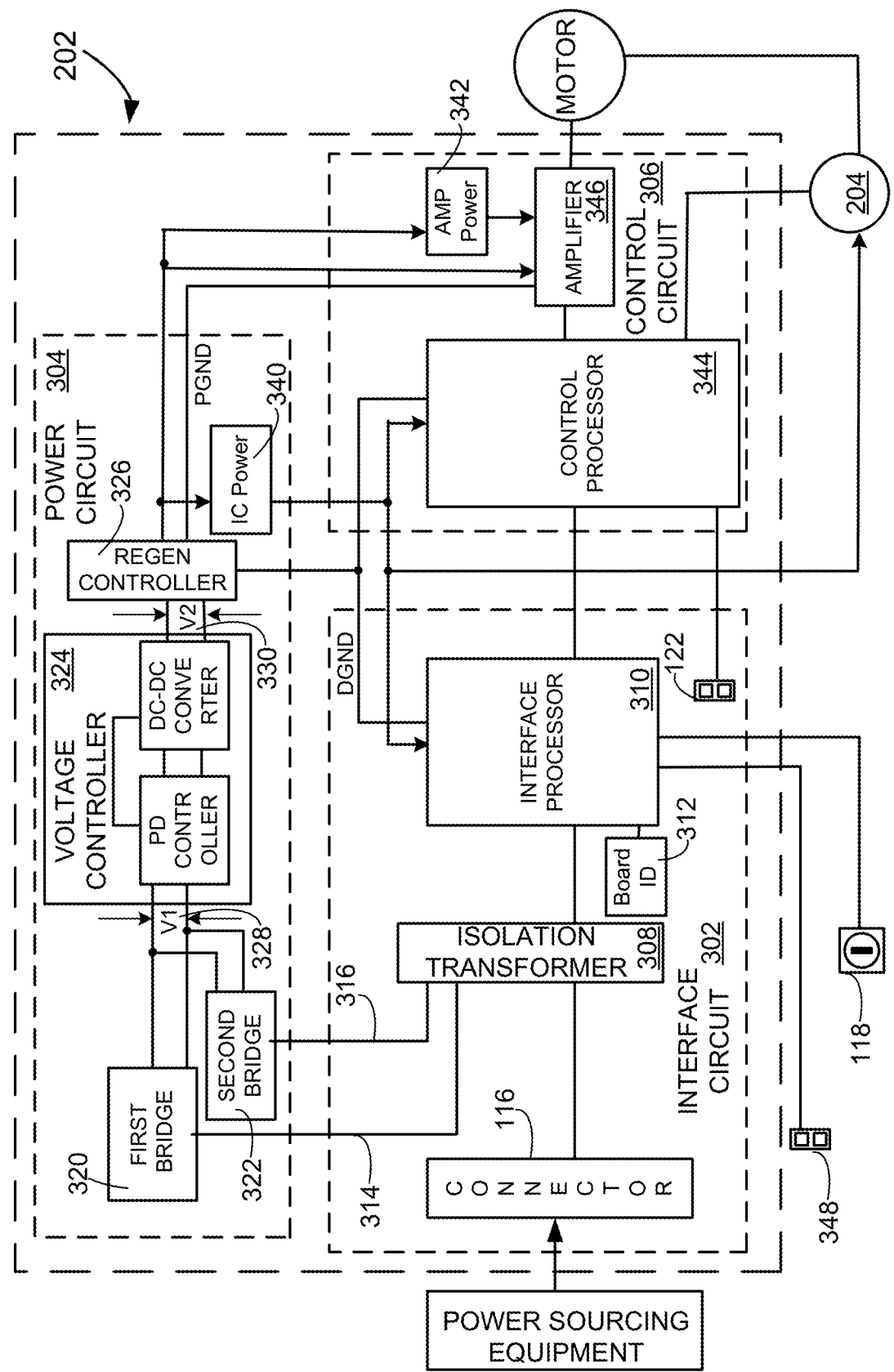
FIG. 3 shows an example electronic circuit for use with an example motor, according to an aspect of this disclosure.

Now, referring to FIG. 3, a block diagram of the electronic circuit 202 is shown. In one example, the electronic circuit 202 includes the interface circuit 302, the power circuit 304 and the control circuit 306. The interface circuit includes the connector 116, the selector switch 118, an isolation transformer 308, an interface processor 310 and a board ID switch 312.

The connector 116 is configured to mate with an external cable to receive both power and data signals from an external device, for example, a network device. The isolation transformer 308 isolates the received power signal and the data signals. The isolation transformer 308 isolates the signals between the external device and the motor so as to protect and isolate the motor and the external device from any transient variations that may be harmful. As one skilled in the art appreciates, for some communication mediums (for example, Ethernet based communication mediums), isolation transformer may be necessary to separate the AC data signals from the DC power. The isolation transformer also allows the two communicating devices to be at a slightly different voltage potential. In some examples, the isolation transformer 308 may be part of the connector 116. The isolation transformer 308 outputs the power signals and data signals.

In one example, the connector 116 includes a first pair of pins and a second pair of pins. In one example, the power signals are received over the first pair of pins. In one example, the power signals are received over the second pair of pins. Both the first pair of pins and second pair of pins are coupled to the isolation transformer 308. The isolation transformer 308 outputs the power signals received over both the first pair of pins and second pair of pins to two separate pairs of signal lines. For example, the power signals received over the first pair of pins is output over first pair of power lines 314. And, the power signals received over the second pair of pins is output over second pair of power lines 316. The power signals outputted by the isolation transformer 308 are received by the power circuit 304.

The data signals are passed on to the interface processor 310. The interface processor 310 communicates with the external device, using one or more defined protocols. The board ID 312 defines a unique address to the electronic circuit 202. In some examples, when the motor is used in a networked environment, the board ID 312 may be set to a MAC ID (Media Access Control ID). In some examples, the selector switch 118 may be selectively set to indicate a network address. The interface processor 310 also communicates with the control circuit 306 over a bus 318.

The power circuit 304 includes a first bridge 320, a second bridge 322, a voltage controller 324 and a regen controller 326. The power signals received over the first pair of power lines 314 is coupled to the first bridge 320. The power signals received over the second pair of power lines 316 is coupled to the second bridge 322. The outputs of the first bridge 320 and second bridge 322 are combined together to present the power signals received by the connector 116 as input to the voltage controller 324. The input voltage to the voltage controller 324 corresponds to a first voltage (V1) 328. The voltage controller 324 steps down the first voltage 328 to a second voltage (V2) 330.

In one example, the second voltage 330 may be further stepped down, based on the voltage needs of various components of the electronic circuit 202 and the motor. In one example, the second voltage (V2) 330 may be further stepped down to a voltage desirable for electronic components, for example, 3.3 volts, for example, by an IC power regulator 340. In yet another example, the second voltage (V2) 330 may be stepped down to 12 Volts, to power an amplifier, for example, by an Amp power regulator 342. In yet another example, the second voltage (V2) 330 may correspond to the operating voltage of the motor.

As one skilled in the art appreciates, when a motor decelerates, the motor acts as a generator and may generate voltage. This generated voltage may add to the second voltage and increase the second voltage at the output of the voltage controller 324. In many powerline communication schemes, it is not permissible to send regenerative energy back out on the powerline. Furthermore, it this was attempted, the regenerative energy is likely to contaminate the communication data. In order to prevent an increase of the second voltage, the regen controller 326 is coupled to the output of the voltage controller 324. The regen controller 326 monitors and controls the second voltage 330 from exceeding beyond a threshold value. Details of the operation of the regen controller 326 will be later described in detail.

The control circuit 306 includes a control processor 344 and an amplifier 346. The control processor 344 receives command signals from the interface processor 310 over the bus 318. The command signals received may indicate the nature and extent of the required rotation of the motor. The interface processor 310 also receives signals indicative of the position of the rotor of the motor from the encoder 204. Based on the received command signals and the signal from the encoder 204, the interface processor 310 generates signals to be processed by the amplifier 346. The amplifier 346 processes the received signals from the interface processor 310 and selectively applies power to the motor. Based on the applied power, the motor selectively rotates, either in a clockwise direction or an anticlockwise direction. The control processor 344 also generates signals to selectively illuminate the light emitting diode 122 of the indicator light assembly 120 to indicate various status of the motor. The interface processor also generates signals to selectively illuminate network status light 348.

Figure 4A:
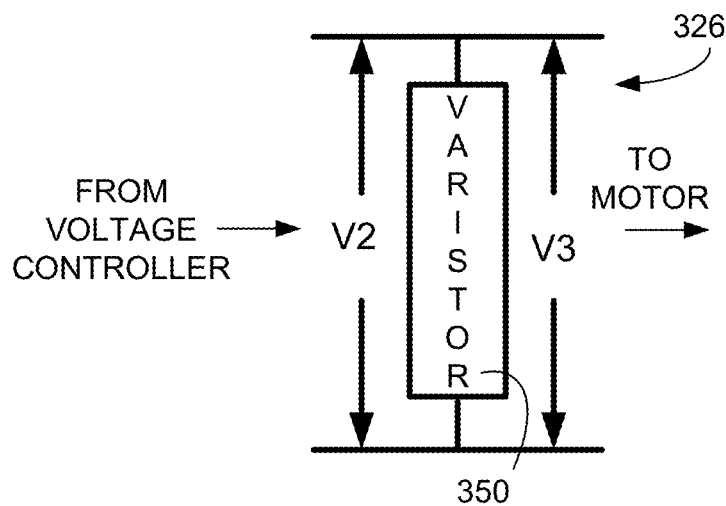
FIG. 4A shows an example regen controller, according to an aspect of this disclosure.

As previously described, the regen controller 326 monitors and controls the second voltage 330 from exceeding beyond a threshold value. In some examples, the regen controller 326 may include a varistor. Referring to FIG. 4A, an example regen controller 326 with a varistor 350 is shown. In this example, the varistor 350 is coupled to the output of the voltage controller 324. Varistor 350 is a voltage dependent non-linear device. The varistor 350 in some examples, behaves similar to a Zener diode.

When exposed to high voltage transients, the varistor 350 impedance changes many orders of magnitude, thereby clamping the transient voltage to a safe level. The voltage V3 represents a voltage that is the sum of voltage V2 and any voltage generated by the motor, when the motor decelerates. When the voltage V3 exceeds a threshold value above acceptable value for voltage V2, the varistor 350 clamps the transient voltage to a safe level.

Figure 4B:
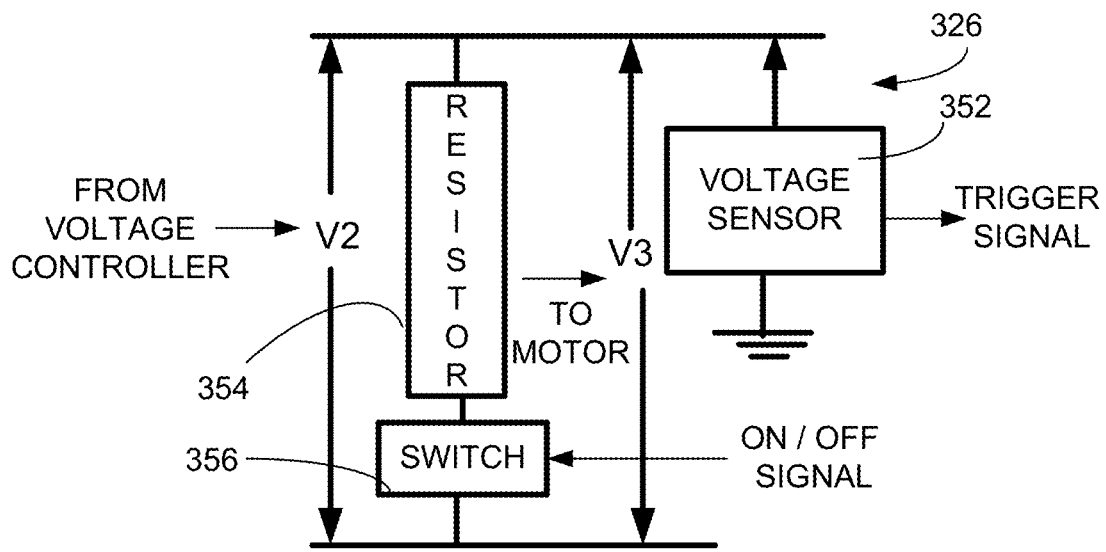
FIG. 4B shows another example regen controller, according to an aspect of this disclosure.

FIG. 4B shows another example implementation for the regen controller 326. Now referring to FIG. 4B, the regen controller 326 includes a voltage sensor 352, a power resistor 354 and a switch 356. The voltage sensor 352 senses the voltage V3. When the difference between the voltage V3 and V2 is above a threshold value, the voltage sensor 352 sends a trigger signal. The trigger signal is received by the control processor 344 and the control processor 344 sends an ON signal to the switch 356. The ON signal turns on the switch and connects the power resistor 354 across the voltage bus. Excess power will be dissipated through the power resistor 354 and voltage V3 will drop.

Once the voltage V3 drops below the threshold value, the voltage sensor 352 sends another trigger signal indicating to the control processor 344 that voltage V3 is within the threshold value, as compared to voltage V2. Then, the control processor 344 sends an OFF signal to the switch 356. Based on the OFF signal, the switch 356 is turned off, thereby disconnecting the power resistor 354 and no current flows through the power resistor 354. As one skilled in the art appreciates, different threshold values may be set for the voltage sensor so that ON signal is generated at a threshold value higher than when the OFF signal is generated. As one skilled in the art appreciates, such an hysteresis threshold may avoid oscillation of the regen controller 326.

As previously described, encoder 204 is configured to precisely measure the rotation of the rotor so as to generate signals to control the rotation of the rotor relative to the stator. In some examples, the encoder 204 may be an optical encoder. A disk with gratings is mounted on the motor shaft. A light source and photo detectors are located on opposing sides of the disk, in a stationary position. As the disk rotates, the on/off passing of light through the windows of the gratings is sensed by the optical detector and an output is generated. In general, the output signal generated by the optical detector will be a square wave, with A and B quadrature pulses.

In some examples, the encoder 204 may be a magnetic encoder. A magnetic encoder includes a gear made of ferrous metal and a magnetic pickup that includes a permanent magnet and a sensing element. The gear which has precisely machined teeth is mounted on the rotating shaft of the motor. The precisely machined teeth provides the code pattern. As the gear rotates, these teeth disturb the magnetic flux emitted by the permanent magnet, causing the flux field to expand and collapse. These changes in the flux field is sensed by the magnetic pickup, which generates a corresponding pulse signal output. When using a magnetic encoder, a magnet must be installed on the rear shaft of the motor. An integrated circuit (IC) that reads the magnet and provides signals to a microcontroller must be precisely located on a printed circuit board that faces the rear shaft. The printed circuit board must also be carefully aligned to the motor using features in the housing of the motor for positive location.

In some examples, the encoder 204 may be a capacitive encoder. A capacitive encoder uses patterns of bars or lines, with one set on the fixed portion and another set on the moving element, to form a variable capacitor, indicative of different shaft position. As the movable portion rotates, an application specific integrated circuit (ASIC) counts the line changes and also interpolates to find the precise position of the encoder and direction of rotation.

In some examples, the encoder 204 may be an inductive encoder. An inductive encoder uses transformer or inductive principles to measure the position of the rotor in relation to the stator. In some examples, the encoder 204 may be a resolver, which includes a rotary transformer with one primary winding and two secondary windings that are phased 90 mechanical degrees apart and transmit a sinusoidal analog signal when the motor rotates.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:
1. A motor, comprising:
a first end bell;
a second end bell;
a stator with a stator coil disposed between the first end bell and the second end bell;
a rotor with a rotor shaft, the rotor disposed relative to the stator, the rotor configured to rotate relative to the stator and the rotor shaft extending through the first end bell;
the second end bell including a chamber, the chamber including an electronic circuit and a connector, wherein the connector is electrically coupled to the electronic circuit and configured to receive both a control signal and a power signal from an external source;
wherein, the external source is a network device and the power signal is received from the network device;
wherein, the electronic circuit includes an interface circuit, a power circuit and a control circuit;

wherein, the power circuit is configured to receive the power signal at a first voltage and a voltage controller steps down the first voltage to a second voltage, second voltage less than the first voltage;

wherein, the connector includes a first pair of pins and a second pair of pins, wherein the power signal is selectively configured to be received over either the first pair of pins or the second pair of pins;

wherein power circuit includes a first bridge and a second bridge, the first bridge configured to electrically couple to the first pair of pins and the second bridge configured to electrically couple to the second pair of pins, with one of the first bridge and the second bridge selectively provide an output based on the power signal received over either the first pair of pins or the second pair of pins respectively; and the selective output from the first bridge and the second bridge is electrically coupled to the voltage controller.

2. The motor of claim 1, further including a regen controller, the regen controller electrically coupled to the voltage controller and configured to prevent the second voltage to increase beyond a threshold value.

3. The motor of claim 2, wherein the regen controller includes a varistor.

4. The motor of claim 2, wherein the regen controller includes a voltage sensor to sense voltage across the voltage controller and a resistor selectively coupled across the output of the voltage controller through a switch.

5. The motor of claim 4, wherein, the voltage sensor generates a trigger signal when the voltage across the voltage controller exceeds a threshold value and the switch is selectively closed to couple the resistor across the output of the voltage controller.

6. The motor of claim 1, wherein an end wall of the chamber is configured to be selectively attached to the chamber.

7. The motor of claim 6, wherein the end wall is attached to the chamber using a plurality of clips configured to mate with a plurality of slits in the chamber.

8. The motor of claim 7, wherein a first seal is disposed between the end wall and the chamber to selectively seal the chamber.

9. The motor of claim 6, wherein a light pipe is disposed on the end wall, the light pipe selectively configured to transmit light emitted by a light emitting diode disposed on the electronic circuit.

10. The motor of claim 1, wherein a second seal is disposed between the second end bell and the chamber to selectively seal the chamber.

11. The motor of claim 1, wherein a third seal is disposed between the first end bell and the rotor shaft.

12. A motor, comprising:
a stator with a stator coil;
a rotor with a rotor shaft, the rotor disposed relative to the stator, the rotor configured to rotate relative to the stator;
a chamber, the chamber including an electronic circuit and a connector, wherein the connector is electrically coupled to the electronic circuit and configured to receive a power signal from an external source;
wherein, the electronic circuit includes a power circuit;
wherein, the connector includes a first pair of pins and a second pair of pins, wherein the power signal is selectively configured to be received over either the first pair of pins or the second pair of pins;

wherein, the power circuit includes a first bridge and a second bridge, the first bridge configured to electrically couple to the first pair of pins and the second bridge configured to electrically couple to the second pair of pins, with one of the first bridge and the second bridge selectively provide an output based on the power signal received over either the first pair of pins or the second pair of pins respectively; and the selective output from the first bridge and the second bridge is electrically coupled to the voltage controller.

13. The motor of claim 12, wherein the electronic circuit includes an interface circuit and a control circuit, the interface circuit, the power circuit and the control circuit are electrically coupled using a plurality of flex circuits.

14. The motor of claim 13, wherein the chamber includes a plurality of slots to receive the interface circuit and the control circuit.

15. The motor of claim 12, wherein, the power circuit is configured to be selectively fastened to a side wall of the chamber, using a plurality of fasteners.

16. The motor of claim 15, wherein an electronic chip disposed over the power circuit contacts the side wall of the chamber, so as to transfer any heat generated by the electronic chip to the chamber wall.

17. The motor of claim 12, further including a regen controller, the regen controller electrically coupled to the voltage controller and configured to prevent an output voltage of the voltage controller to increase beyond a threshold value.

18. The motor of claim 17, wherein the regen controller includes a varistor.

19. The motor of claim 17, wherein the regen controller includes a voltage sensor to sense the output voltage of the voltage controller and a resistor selectively coupled across the output of the voltage controller through a switch.

20. The motor of claim 19, wherein, the voltage sensor generates a trigger signal when the output voltage of the voltage controller exceeds a threshold value and the switch is selectively closed to couple the resistor across the output of the voltage controller.

21. The motor of claim 12, wherein an end wall of the chamber is configured to be selectively attached to the chamber.

22. The motor of claim 21, wherein the end wall is attached to the chamber using a plurality of clips configured to mate with a plurality of slits in the chamber.

23. The motor of claim 21, wherein a first seal is disposed between the end wall and the chamber to selectively seal the chamber.

24. The motor of claim 21, wherein a light pipe is disposed on the end wall, the light pipe selectively configured to transmit light emitted by a light emitting diode disposed on the electronic circuit.

25. The motor of claim 12, wherein the chamber is disposed along an axis parallel to the rotor shaft.

26. The motor of claim 12, wherein the chamber is disposed along an axis perpendicular to the rotor shaft.

* * * * *